April 19, 1960   W. G. WEATHERLY ET AL   2,932,993
CHAIN SAW FILING TOOL
Filed June 9, 1958

JOSEPH J. ANGELO
WILLIAM G. WEATHERLY
INVENTOR.

BY *James A. Girnan*
ATT'Y

United States Patent Office 2,932,993
Patented Apr. 19, 1960

2,932,993

CHAIN SAW FILING TOOL

William G. Weatherly, Clarkston, Wash., and
Joseph J. Angelo, Lewiston, Idaho

Application June 9, 1958, Serial No. 740,697

4 Claims. (Cl. 76—36)

This invention relates to saw filing devices and more particularly to one that is portable and adjustably adaptable for use in filing the cutting and raking teeth of a wide variety of chain saws.

There are many types and designs of chain saws in use in the widespread forestry industry and nearly every one of the individual makes requires a different sharpening implement.

In general, the filing of a chain saw has heretofore been a tedious manual operation involving in most cases the removal of the chain saw from the saw bar with the teeth being filed separately by a hand file.

Accordingly it is one of the principal objects of our invention to provide a saw filing device of the character described which is highly portable for use in the field or forest or other sawing operation, readily adaptable and adjustable to any saw bar to accurately and speedily sharpen chain saws having teeth of diverse contours without removing the chain saw from the saw bar and with full assurance to an operator without special skill in handling files that the filing will be precisely done at the proper angle and depth.

The foregoing and other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
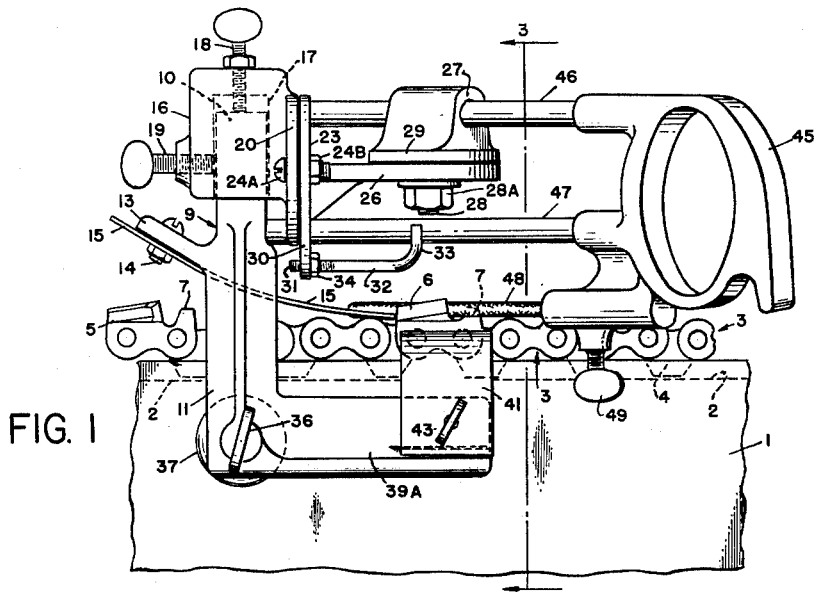
Figure 1 is a side elevational view of a chain saw filing device made in accordance with our invention and shown removably secured to a fragment of a saw bar in operative relation to the teeth of a chain saw.

With continuing reference to the drawing, wherein like reference numerals designate like parts throughout, reference numeral 1 indicates a saw bar having the usual U-shaped case hardened groove 2 about its peripheral edge which forms a track around which the chain saw 3 travels by means of its guides 4 being confined within the groove. The chain saw may have the type of teeth shown, including right-facing and left-facing cutting teeth 5 and 6 respectively and raking teeth 7, or the teeth may be any of the other well known types.

The saw filing device of our invention, in its present embodiment, comprises a main body in the form of a casting indicated generally at 9 including a substantially rectangular top end 10 to serve as a guide integrated with spaced apart L-shaped legs 11 and 12 and an upwardly and outwardly inclined lug 13 to whose underside is secured as at 14 one end of a locking spring arm 15. The opposite end of the arm is adapted to bear down on the chain saw and against the trailing end of one of the teeth (6) as shown for a purpose to be hereinafter described.

A head 16 having a downwardly opening recess 17 therein is thereby adapted for placement over the guide 10, and by means of thumb-screws 18 and 19 is respectively vertically adjustable and lockable relative to the head. One side of the head is formed into a circular face plate 20 having diametrically opposed indexing apertures 21 therethrough. Confronting the face plate and rotatable relative thereto is an indexing plate 23 correspondingly apertured as at 24. Bolts 24A are selectively insertable through the aligned apertures 21 and 24 and are provided with nuts 24B for locking the plates in adjusted positions relative to each other. Integrated with the indexing plate 23 is a horizontal platform 26 upon which is pivotally mounted a slide bearing 27 by means of a pivot bolt 28 secured to the circular base 29 of the slide bearing and extending through the platform. A lock nut 28A is provided for locking the slide bearing in any angular position relative to the platform. The bottom portion of the plate 23 is extended downwardly as at 30 and apertured and threaded to receive the threaded end 31 of an abutment arm 32 turned upwardly at its outer end as at 33 and provided with a lock nut 34 at its threaded end. Since the teeth of saw chain saws are sharpened in the direction of their length from front to rear and not downwardly as in hand saws, band saws, circular saws and the like, the abutment arm 32 is an important feature of the invention in that it assures a uniform amount of filing of each tooth.

For securing the body 9 in an operative position with its legs straddling the saw bar 1 as shown we provide one leg 11 with a clamping screw 36 provided at its inner end with a clamping disc 37. For firmly holding the particular saw tooth being dealt with during the filing operation we provide the free end of the horizontal portion 39 of the leg 12 with a clamping member 40 and the corresponding end 39A of the leg 11 with a companion clamping member 41. The clamping members are attached to their respective ends of the leg members 39 and 39A by means of a bolt and a thumb-screw indicated respectively at 42 and 43.

The file carrier frame comprises a handle 45 into which are threadedly secured a guide rod 46 slidably and pivotally carried by the slide bearing 27, and a companion rod 47. A file 48 is removably secured at one of its ends within the bottom portion of the handle 45 by means of thumb-screw 49 and thereby maintained in parallel relation to the rods 46 and 47.

Figure 2:
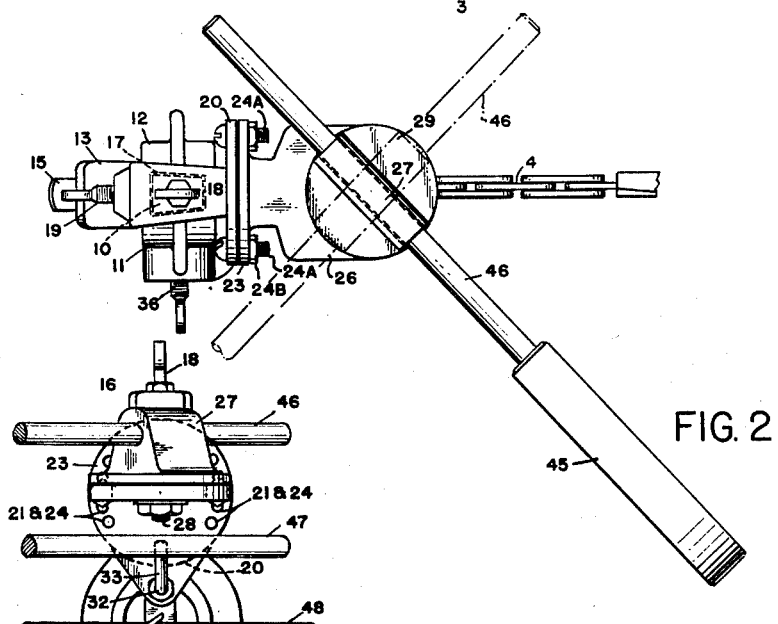
Figure 2 is a top plan view of Figure 1.
Figure 3:
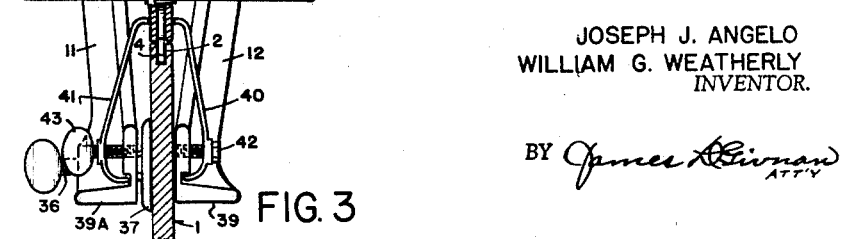
Figure 3 is a sectional end view taken approximately along the line 3—3 of Figure 1.

The operation of the invention is as follows:

Since the teeth of a chain saw are positioned thereon so that their cutting faces are oppositely disposed in alternate relation to each other, such teeth, for example the left-facing saw teeth 6, may be filed from one side of the saw bar with the file carrier frame set in the angular position shown in Figures 1 and 2; then by swinging the frame by means of the slidebearing turret 29 into the broken line position shown in Figure 2 the right-facing teeth 5 may be filed from the same side of the saw bar.

The main body 9 is first placed over the saw bar, as shown, with the file 48 in proper contact with the cutting surfaces of the tooth to be filed and with the free end of the locking spring bar 15 abutting the end of that tooth and bearing down on the top of an adjacent link. The body 9 is then secured to the saw bar by means of the clamping screw 36. The thumb-screw 43 is then advanced on its threads to force the top end of the clamping member 41 against the tooth to be filed which is backed by the pre-set clamping member 40. With the tooth thus firmly held the filing thereof can be accurately accomplished by reciprocal movement of the handle 45 guided by the slide bearing 27 and stabilized against excessive twisting movement to the left by the rod 47 working in sliding contact with the upturned end 33 of the abutment arm 32. This end of the arm is pre-set and locked by the nut 34 in predetermined relation to the file to thereby limit the extent of the lengthwise file cut in any tooth held between the clamping members 40 and 41. Upon completion of the filing of one tooth the file can be freely swung upwardly and out of the way of the next tooth being pulled by the chain into a filing position between the clamping members after the free end of spring bar 15 has been lifted out of abutment with the finished tooth.

For tilting the file into an upwardly or downwardly inclined operative position relative to a tooth to be filed, it is merely necessary to remove the bolts and nuts 24A and 24B, rotate the indexing plate 23 through the desired number of degrees and re-locking it in the selected position by replacing the bolts and nuts.

For adjusting the head 16 and hence the file vertically relative to a tooth it is merely necessary to manipulate the adjusting screw 18 and locking screw 19.

From the foregoing it will be apparent that we have provided a chain saw filing tool which can be quickly and conveniently attached to a saw bar without weakening the saw bar by drilling supporting openings therethrough and which can be readily and accurately adjusted into precision filing positions relative to saw teeth of a wide variety of designs and dimensions.

While we have shown a particular form of embodiment of our invention we are aware that many minor changes therein will readily suggest themselves to others skilled in the art without departing from the spirit and scope of the invention. Having thus described our invention what we claim as new and desire to protect by Letters Patent is:

1. A chain saw filing tool comprising, in combination a body member removably securable to a saw bar, a slide bearing carried by the body member and pivotally adjustable and lockable relative thereto, a file carrier frame comprising a supporting guide rod slidably and swingably carried by said slide bearing and a second rod in vertical alignment with and disposed below said guide rod, a file removably secured to said carrier frame below said second rod and movable by the frame into and out of a filing position relative to the teeth of the chain saw, horizontally disposed abutment means carried by said body and horizontally adjustable relative to said second rod to provide a limit stop for lateral movement of the carrier frame in that direction and hence the extent of tooth filing in the direction of the length of the tooth by reciprocal movement of the carrier frame.

2. A chain saw filing tool as claimed in claim 1 including means for pivotally adjusting said slide bearing in a horizontal plane and in a vertical plane and means for locking the slide bearing in any of said adjustments.

3. A chain saw filing tool comprising a body member adapted to straddle a saw bar and chain saw mounted on the saw bar, means carried by the body member adapted to engage opposite sides of the saw bar for rigidly mounting the body member to the saw bar, clamping means attached to the body member and adapted to grip and hold a saw tooth in a fixed position, spring means attached at one of its ends to the body member in abutment at its opposite end with said tooth and normally bearing down on the chain saw, a head attached to the body member, means carried by the head for vertically adjusting and locking it relative to the body member, a slide bearing carried by the head and pivotally adjustable horizontally and lockable relative thereto, a file carrier frame comprising a supporting guide rod slidably and swingably carried by said slide bearing and a second rod in vertical alignment with and disposed below said guide rod, a file removably secured to said carrier frame and movable thereby into and out of a filing position relative to the teeth of the chain saw, horizontally disposed abutment means carried by said head and horizontally adjustable relative to said second rod to provide a limit stop for lateral movement of the carrier frame in that direction and hence the extent of tooth filing in the direction of the length of the tooth by reciprocal movement of the carrier frame.

4. A chain saw filing tool as claimed in claim 3 including means for pivotally adjusting said slide bearing in a horizontal plane and in a vertical plane and means for locking the slide bearing in any of said adjustments.

References Cited in the file of this patent

UNITED STATES PATENTS

| | | |
|---|---|---|
| 409,866 | Penrose | Aug. 27, 1889 |
| 910,893 | Becker | Jan. 26, 1909 |
| 1,900,084 | Waller | Mar. 7, 1933 |
| 2,441,786 | Zapart | May 18, 1948 |
| 2,677,289 | Fitch | May 4, 1954 |
| 2,813,438 | Paradis et al. | Nov. 19, 1957 |
| 2,818,752 | Granberg | Jan. 7, 1958 |